United States Patent
Spoliansky et al.

(10) Patent No.: US 12,380,358 B2
(45) Date of Patent: Aug. 5, 2025

(54) SYSTEMS AND METHODS FOR TRAINING AND MODIFYING A COMPUTER-BASED MODEL TO PERFORM CLASSIFICATION

(71) Applicant: PAYPAL, INC., San Jose, CA (US)

(72) Inventors: Roi Spoliansky, Ramat Yishay (IL); Razi Fachar Eldeen, Haifa (IL)

(73) Assignee: PAYPAL, INC., San Jose, CA (US)

( * ) Notice: Subject to any disclaimer, the term of this patent is extended or adjusted under 35 U.S.C. 154(b) by 988 days.

(21) Appl. No.: 17/157,057

(22) Filed: Jan. 25, 2021

(65) Prior Publication Data
US 2022/0237502 A1   Jul. 28, 2022

(51) Int. Cl.
  *G06N 20/00* (2019.01)
  *G06N 5/04* (2023.01)

(52) U.S. Cl.
  CPC .............. *G06N 20/00* (2019.01); *G06N 5/04* (2013.01)

(58) Field of Classification Search
  CPC ................................. G06N 20/00; G06N 5/04
  See application file for complete search history.

(56) References Cited

U.S. PATENT DOCUMENTS

| | | | |
|---|---|---|---|
| 2003/0069820 A1* | 4/2003 | Hillmer | G06Q 40/00 705/35 |
| 2020/0126636 A1* | 4/2020 | Yu | G16H 20/10 |
| 2020/0309790 A1* | 10/2020 | Debad | G01N 33/6863 |
| 2020/0321124 A1* | 10/2020 | Ford | A61B 5/7267 |
| 2021/0047679 A1* | 2/2021 | Lo | G16B 40/10 |
| 2022/0067752 A1* | 3/2022 | Fang | H04L 63/20 |
| 2023/0289595 A1* | 9/2023 | Khosousi | G16H 20/40 |

FOREIGN PATENT DOCUMENTS

| | | | |
|---|---|---|---|
| EP | 3059694 A1 * | 8/2016 | G06F 21/552 |

OTHER PUBLICATIONS

Narasimhan, H., & Agarwal, S. A structural SVM based approach for optimizing partial AUC. (Feb. 2013). PMLR. In International Conference on Machine Learning (pp. 516-524). (Year: 2013).*

* cited by examiner

*Primary Examiner* — Michael J Huntley
*Assistant Examiner* — Maggie Thanh Maido
(74) *Attorney, Agent, or Firm* — Haynes and Boone, LLP

(57) ABSTRACT

Methods and systems are presented for a computer-based models enhancing by iteratively evaluating and modifying a computer-based model configured to perform data classifications. A model development system builds a computer-based model under an initial configuration. The model development system may evaluate the performance of the computer-based model under the initial configuration using a partial area under the curve technique. The model development system may re-configure the computer-based model under a different configuration. The different configuration may specify a different number of input parameters for the computer-based model, different input parameters, different hyper-parameters, and/or different weights assigned to the training data. The model development system may continue to re-configure the computer-based models under different configurations and evaluate the computer-based models under the different configurations to determine an optimal configuration for deploying the computer-based model.

20 Claims, 7 Drawing Sheets

SYSTEMS AND METHODS FOR TRAINING AND MODIFYING A COMPUTER-BASED MODEL TO PERFORM CLASSIFICATION

BACKGROUND

The present specification generally relates to computer modeling, and more specifically, to techniques in training and modifying a computer model to improve the performance of the computer model according to various embodiments of the disclosure.

RELATED ART

Computer-based models, such as a machine learning model, are often used by online service providers to perform analysis and predictions (e.g., risk analysis/predictions, etc.) because they are capable of analyzing voluminous data and providing predictions quickly and accurately, based on patterns derived from historical data. A common application for using the computer-based models is to perform data classification, such as classifying an electronic transaction as a fraudulent transaction or a legitimate transaction, classifying a user account as a malicious account or a legitimate account, classifying a presence of a disease in a patient, etc. The computer-based model may be configured to receive a set of input parameters associated with the data (e.g., attributes associated with a transaction, a user account, a patient, etc.) and to provide an output value indicating a classification of the data based on manipulations of the set of input parameters. By training the computer-based model using the training data, the way that the set of input parameters is manipulated to provide the output value may be adjusted to improve the consistency and accuracy performance of the computer-based model.

While training a computer-based model enables the computer-based model to learn patterns based on historical data to provide future classifications, the improvements are determined based on the specific configuration (e.g., a specific set of input parameters, a specific cutoff value, etc.) used by the computer-based model during the training process. As such, the improvements are not based on a comprehensive evaluation of the performance of the computer-based model in general, which reduces the accuracy of the output or prediction. Thus, there is a need for providing a process for providing a comprehensive evaluation and modifications of a computer-based model to provide additional performance improvements to the computer-based model.

Figure 1:
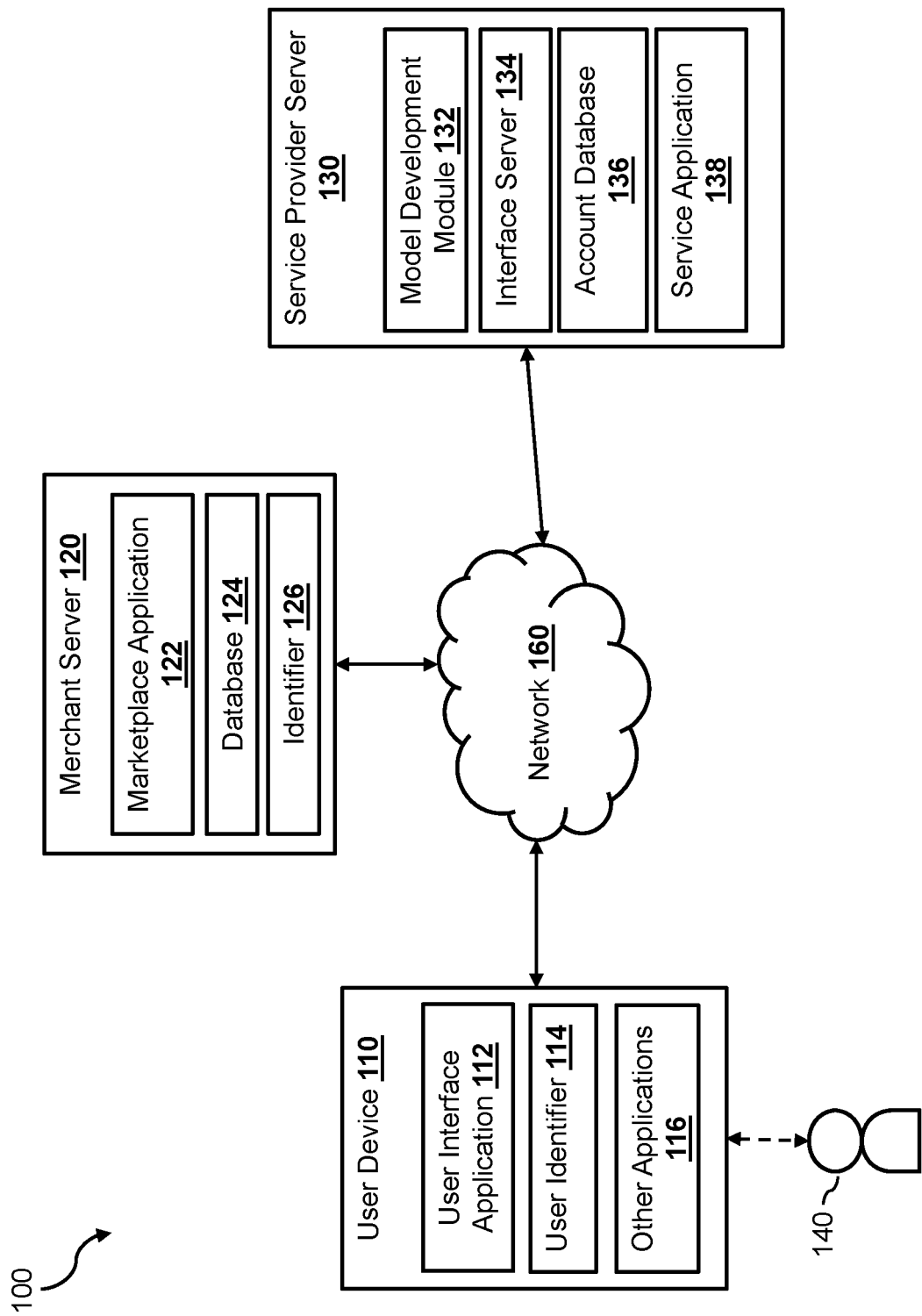
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for evaluating and modifying a computer-based model configured to perform data classifications. In some embodiments, a model development system may develop a computer-based model by iteratively evaluating, re-configuring, and re-training the computer-based model to improve the accuracy performance of the computer-based model. The computer-based model may be a machine learning model that can be trained using training data (e.g., historic data) or other types of models such as a regression model, a clustering model, etc.

In some embodiments, the model development system may build a computer-based model under an initial (e.g., a first) configuration. The computer-based model may be configured to provide, based on a set of input parameters associated with a set of data, an output value indicating a classification of the set of data. For example, the set of data may be associated with an electronic transaction (e.g., a login transaction, an electronic payment transaction, a content access transaction, etc.). The output value from the computer-based model may indicate whether the electronic transaction is of a first classification (e.g., a fraudulent transaction) or a second classification (e.g., a legitimate transaction). In another example, the set of data may be associated with a user account, and the output value may indicate whether the user account is of a first classification (e.g., a fraudulent account) or a second classification (e.g., a legitimate account). In yet another example, the set of data may be associated with a patient (e.g., biometrics of the patient, test results of the patient, etc.), and the output value may indicate a presence of a disease for the patient.

Different cutoff values (e.g., thresholds) may be used for the classification based on the same computer-based model. The cutoff values may determine whether a certain output value from the computer-based model represents a first (e.g., a positive) classification (e.g., when the output value is above the cutoff value) or a second (e.g., a negative) classification (e.g., when the output value is equal to or below the cutoff value). By adjusting the cutoff values, the classification characteristics (e.g., a true positive rate, a false positive rate, etc.) may be changed. In using a binary classification example where a set of data can be classified as either positive or negative (e.g., whether a transaction is a fraudulent transaction or not, whether a user account is a fraudulent account or not, etc.), increasing the cutoff value may lead to a reduction in false positives (e.g., sets of data that are incorrectly classified as positive), but also lead to an increase in false negatives (e.g., sets of data that are incorrectly classified as negative). Conversely, decreasing the cutoff value may lead to an increase in false positives, but also lead to a reduction in false negatives.

By testing the computer-based model with different cutoff values, a particular cutoff value (or a particular range of cutoff values) may be determined to provide a desirable performance result. In some embodiments, due to shift in the characteristics of the sets of data (e.g., characteristics of transactions, user accounts, patients, etc.), the cutoff value may be adjusted such that the computer-based model can adapt to the shift in the characteristics.

The set of input parameters for the computer-based model may include attributes associated with the set of data. For classifying an electronic transaction, possible attributes that may be used as part of the set of input parameters may include one or more of a payment amount associated with the transaction, a time of day or a day of month when the transaction was initiated, historic transaction frequency associated with an account involved in the transaction, historic transaction amounts associated with the account, an identity of a payee, a network address (e.g., an Internet Protocol (IP) address) of a device that initiated the electronic transaction, and other information associated with the electronic transaction. For classifying a user account, possible attributes that may be used as part of the set of input parameters may include one or more of a transaction history of the user account, login frequency associated with the user account, a rate of failed logins associated with the user account, network addresses of devices used to access the user account, and other information associated with the user account. For classifying a presence of a disease in a patient, possible attributes that may be used as part of the set of input parameters may include a blood pressure of the patient, a blood type of the patient, DNA characteristics of the patient, and other biometrics or test results associated with the patient.

As such, the initial (e.g., the first) configuration may specify the number of input parameters (also referred to as "features") and which input parameters (selected from the possible attributes) for use by the computer-based model to perform data classifications. If the computer-based model is a machine learning model, the first configuration may also specify the hyperparameter of the computer-based model. The first configuration may be determined based on inputs provided by a model administrator or based on configuration data associated with similar models created and/or used in the past.

The model development system may train the computer-based model using a set of training data. The training data may be associated with historic data that has been previously labeled (e.g., classified). For example, when the computer-based model is configured to classify electronic transactions, the set of training data may include electronic transactions that have been conducted in the past and have been labeled (e.g., classified as fraudulent or legitimate by a human or another model). When the computer-based model is configured to classify user accounts, the set of training data may include user accounts that have been labeled in the past. Once the computer-based model is trained, the computer-based model is ready to be used to classify data. However, in some embodiments, the model development system may perform additional processing to further improve the performance of the computer-based model before deploying the computer-based model for classifying data. The additional processing may include iteratively evaluating, re-configuring, and re-training the computer-based model.

In some embodiments, the model development system may evaluate (e.g., assess the performance of) the computer-based model using a partial area under the curve technique. According to the partial area under the curve technique, the model development system may generate a graph including a curve that represents a performance of the computer-based model with respect to multiple different cutoff values (e.g., different thresholds). An example graph may be a receiver operating characteristic (ROC) graph. The ROC graph is a two-dimensional graph that tracks the relationship between a true positive rate (TPR) of a computer-based model and a false positive rate (FPR) across different cutoff values used in the classification. The model development system may use the computer-based model to classify multiple sets of data (e.g., the set of training data) multiple times, each time using a different cutoff value. After each pass of classifying the multiple sets of data using a corresponding cutoff value, the model development system may calculate a TPR and a FPR for that pass (e.g., for that cutoff value), and plot a point at the intersection of the TPR and the FPR in the graph. The point in the graph represents the performance of the computer-based model with respect to the cutoff value used for classifying data. Thus, each time the model development system runs the computer-based model through the multiple sets of data using a particular cutoff value, the model development system generates an additional point in the graph, representing the performance of the computer-based model at another cutoff value. The model development system may continue to use the computer-based model to classify the multiple sets of data using different cutoff values. When the output values are in the range between 0 and 100, the cutoff values may include 5, 10, 17, 25, 50, 62, 74, 84, 97, and so forth. After running the computer-based model through the multiple sets of data multiple times using the different cutoff values, the model development system may generate multiple points in the graph. The model development system may then connect the points to generate a curve. Thus, the curve represents the performance of the computer-based model with respect to various cutoff values.

A comprehensive evaluation of the performance of the computer-based model across a range of cutoff values can be determined based on the curve. In some embodiments, the model development system may calculate a performance value for the computer-based model based on a size of the area under the curve in the graph, where a larger performance value (e.g., a larger area under the curve) indicates a better performance while a smaller performance value (e.g., a smaller area under the curve) indicates a worse performance. The model development system may use the performance value to re-configure the computer-based model. For example, the model development system may continue to increase the number of input parameters for the computer-based model when the performance values indicate an upward trend. Conversely, the model development system may stop increasing the number of input parameters for the computer-based model (or reversing the course by decreasing the number of input parameters) when the performance values does not indicate a trend or indicate a downward trend.

The curve in the graph may represent the performance of the computer-based model under a broad range of cutoff values (e.g., 0%-100%, etc.). In reality, however, only a sub-range of the cutoff values (e.g., 45%-65%) are (will be) used by the computer-based model in performing data classification, as other cutoff values would produce sub-optimal results based on realistic data. As such, using the entire area under the curve to evaluate the performance of the computer-based model may be misleading. For example, the computer-based model under a first configuration may perform worse than the computer-based model under a second configuration within the sub-range of the cutoff values. However, the first configuration may have a larger overall area under the curve possibly because the performance of the computer-based model under the first configuration performs relatively better than the computer-based model under the second configuration using cutoff values outside of the sub-range of the cutoff values. Since the cutoff values outside of the sub-range will not be used to perform data classification, the performance of the computer-based model with respect to those cutoff values outside of the sub-range is irrelevant.

Thus, in some embodiments, instead of determining the performance of the computer-based model based on the entire area under the curve of the graph, the model development system may calculate only a partial area under the curve of the graph. The model development system may determine a sub-range of cutoff values for the computer-based model based on different factors, such as a historic usage of the computer-based model (or similar models in performing the same type of data classification), input received from a human administrator, and/or statistical analysis of the curve. The model development system may then calculate a partial area under the curve corresponding to the determined sub-range of cutoff values and determine a performance value for the configuration of the computer-based model based on the partial area under the curve.

In some embodiments, the model development system may re-configure the computer-based model based on the performance value that is determined using the partial area under the curve techniques as disclosed herein. For example, the model development system may use the performance value to determine a number of input parameters for the computer-based model. The model development system may configure the computer-based model initially (under a first configuration) using an initial number of parameters (e.g., 1, 50, 100, etc.). The model development system may determine a first performance value for the first configuration of the computer-based model using the partial area under the curve techniques. The model development system may then re-configure the computer-based model using a different configuration (e.g., a second configuration) by progressively increasing (or decreasing) the number of input parameters (e.g., by adding a new parameter or removing an existing parameter). The model development system may determine another performance value (e.g., a second performance) value for the second configuration of the computer-based model. The model development system may continue to re-configure the computer-based model and evaluate the performance of the computer-based model under the new configurations.

In some embodiments, the model development system may re-configure the computer-based model based on the trend in the changes of performance of the computer-based model under different configurations. For example, when the performance continues to increase (at a linear or exponential rate) with the increasing of the number of input parameters, the model development system may continue to re-configure the computer-based model by increasing the number of input parameters. However, when the performance stops improving (or the improvement has slowed down below a threshold rate), the model development system may stop increasing the number of input parameters, or alternatively, decreasing the number of input parameters. In some embodiments, the model development system may determine an optimal configuration (e.g., the optimal number of input parameters) for the computer-based model based on a pattern or a trend of the performance value (e.g., when the performance of the computer-based model does not improve from the previous configuration by a threshold, etc.).

Instead of, or in addition to, modifying the number of input parameters, the model development system may modify other aspects of the configurations. For example, the model development system may modify the input parameters (e.g., using one or more different input parameters) for the computer-based model for the re-configuration. The model development system may select a different input parameter for each iteration of re-configurating the computer-based model. The model development model may then evaluate a change of performance to the computer-based model using the partial area under the curve techniques based on the different input parameters. This way, the model development model may determine a set of input parameters that is relevant to the data classification. Specifically, each input parameter in the set of input parameters improve the performance of the computer-based model within the range of cutoff values when the input parameters are used.

When the computer-based model is a machine learning model, the model development system may modify one or more hyper-parameters of the machine learning model during each iteration of re-configuring the model. A hyper-parameter is a parameter that controls the learning process of the machine learning model. The hyper-parameters do not change during the training process, while other parameters (e.g., node weights, etc.) can be adjusted during the training process. The hyper-parameters affect the speed and quality of the learning process. Thus, the model development system may iteratively modify one or more hyper-parameters associated with a training process for training the machine learning model, train the machine learning model with training data, and evaluate the performance of the machine learning model using the partial area under the curve techniques. The model development system may determine an optimal set of hyper-parameters for training the machine learning model based on the evaluations.

In some embodiments, the model development system may assign weights to different sets of training data. The weights to the different sets of training data may affect how the machine learning model is trained (the extent of adjustment from each set of training data). For example, a set of training data may be deemed more important to an organization (e.g., a riskier region for transactions, etc.), thus, the model development system may assign a higher weight to that set of training data. During the evaluation process, the model development system may iteratively adjust the weights assigned to the different sets of training data and determine whether the adjustment to the weights improve or reduce the performance of the computer-based model using the partial area under the curve technique. The model development system may then determine the optimal weights for the sets of training data for training the computer-based model.

Once the model development system determines an optimal configuration, the model development system may re-train the computer-based model using training data if the computer-based model is a machine learning model. The model development system may deploy the computer-based model under the optimal configuration. For example, the computer-based model may be used to perform data classification (e.g., classifying at transaction, classifying a user account, classifying a patient, etc.). Since the computer-based model is configured (or re-configured) based on a comprehensive evaluation of the performance across a range of relevant cutoff values, the improvement to the computer-based model is both comprehensive and targeted, which provides an improvement to computer-based model configuration than conventional methods that increases the accuracy of the outputs or predictions of such models.

FIG. 1 illustrates an electronic transaction system 100, within which the model development system may be implemented according to one embodiment of the disclosure. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online purchase transaction with the merchant server 120 via websites hosted by, or mobile applications associated with, the merchant server 120 respectively. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one user identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the user identifier 114 may be passed with a user login request to the service provider server 130 via the network 160, and the user identifier 114 may be used by the service provider server 130 to associate the user with a particular user account (e.g., and a particular profile) maintained by the service provider server 130.

In various implementations, the user 140 is able to input data and information into an input component (e.g., a keyboard) of the user device 110. For example, the user 140 may use the input component to interact with the user interface application 112 (e.g., to add a new funding account, to provide information associated with the new funding account, to initiate an electronic payment transaction, etc.).

While only one user device 110 is shown in FIG. 1, it has been contemplated that multiple user devices, each associated with a different user, may be connected to the merchant server 120 and the service provider server 130 via the network 160.

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for purchase and process payments for the purchases. The merchant server 120 may include a database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items available for purchase in the merchant database 124. The merchant server 120, in one embodiment, may include at least one identifier 126, which may be included as part of the one or more items made available for purchase so that, e.g., particular items are associated with the particular merchants. In one implementation, the identifier 126 may include one or more attributes and/or parameters related to the merchant, such as business and banking information. The identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user device 110 and the service provider server 130 via the network 160.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (e.g., the user 140 or a merchant associated with the merchant server 120, etc.) may access a user account associated with the user and access various services offered by the service provider server 130, by generating HTTP requests directed at the service provider server 130.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 includes a model development module 132 that implements the model development system as discussed herein. The model development module 132 may be configured to develop one or more computer-based models that can be used by one or more other modules within the service provider server 130 (e.g., the interface server 134, the service application 138, etc.) for processing transactions for users of the service provider server 130. For example, the model development module 132 may develop a transaction risk assessment model configured to classify a transaction as a fraudulent transaction or not a fraudulent transaction. Thus, upon receiving a transaction request, from the user device 110 and/or the merchant server 120, the service application 138 may use the transaction risk assessment model to determine whether the transaction request is associated with a fraudulent transaction or a legitimate transaction. The service application 138 may either process the transaction request if the transaction risk assessment model determines that it is associated with a legitimate transaction or deny the transaction request if the transaction risk assessment model determines that the request is associated with a fraudulent transaction. In other embodiments, the service application 138 may request additional information, such as additional authentication information, from the user 140 or user device 110 if the transaction risk assessment model determines that the request is associated with a possible fraudulent transaction.

In another example, the model development module 132 may develop a user account assessment model configured to classify a user account as a fraudulent account or not a fraudulent account. Upon receiving a request to access a user account or conduct a transaction through a user account, the interface server 134 may use the user account assessment model to determine whether the user account is a fraudulent user account (e.g., used and/or controlled by a malicious user who intends to cause harm to the service provider of the service provider server 130 or other users) or a legitimate user account. The interface server 134 may provide the user 140 access to the user account if the user account assessment model classifies the user account as a legitimate account or deny the user 140 access to the user account if the user account assessment model classifies the user account as a fraudulent account. In other embodiments, the user account assessment model may determine the user account is a possible fraudulent account, such that the system may request additional information from user 140 or user device 110, such as further authentication information or account details, before deciding whether to allow or deny access to the account.

Figure 2:
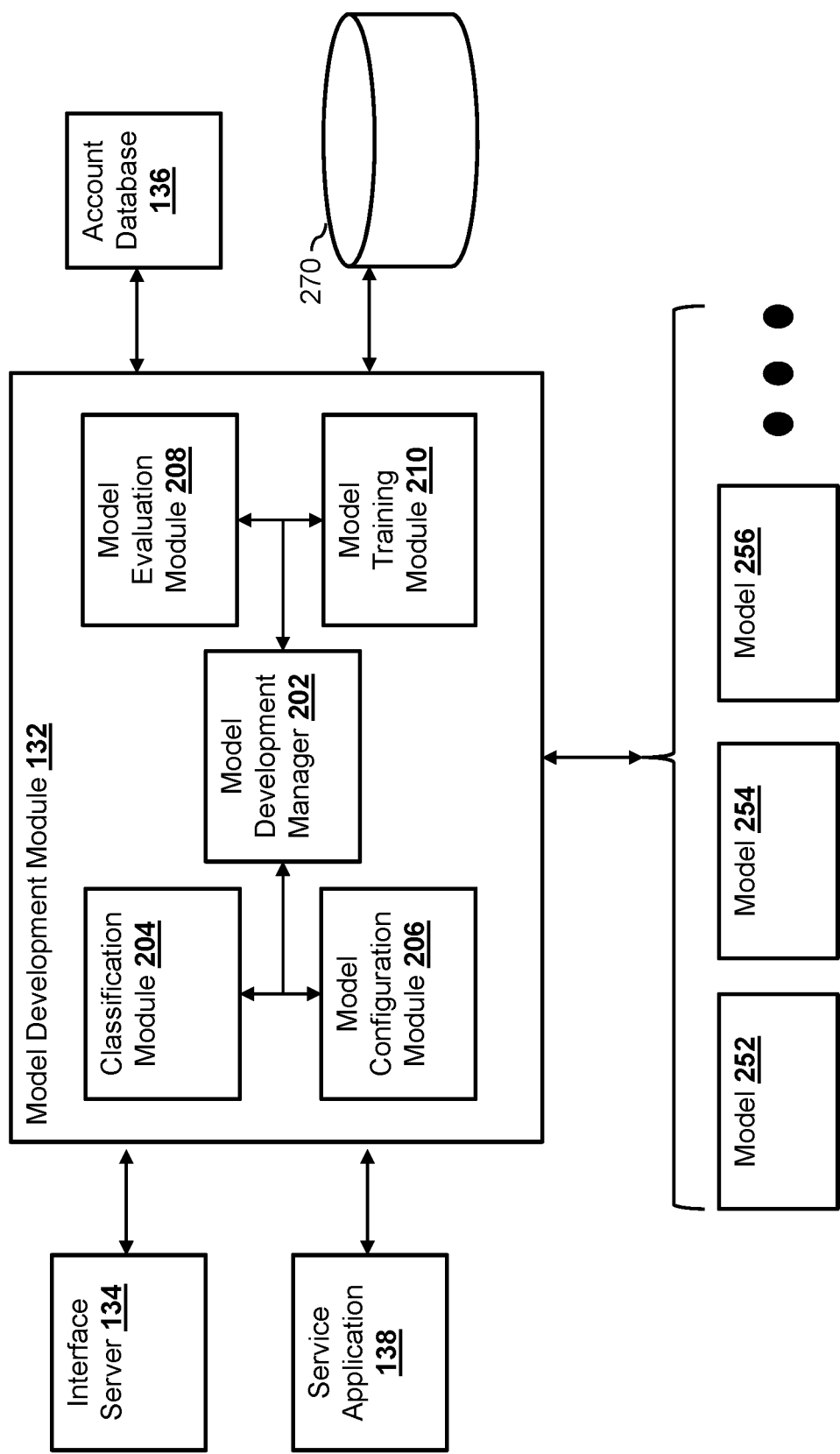
FIG. 2 is a block diagram illustrating a model development module according to an embodiment of the present disclosure.

FIG. 2 illustrates a block diagram of the model development module 132 according to an embodiment of the disclosure. The model development module 132 includes a model development manager 202, a classification module 204, a model configuration module 206, a model evaluation module 208, and a model training module 210. The model development module 132, in some embodiments, may develop one or more computer-based models 252-256 for use by other modules of the service provider server 130 in performing data classification. Each of the computer-based models 252-256 may be a machine learning model, a regression model, a clustering model, or other type of model that can be used for data classification. The models 252-256 developed by the model development module 132 may be configured to perform different types of classifications (e.g., transaction risk classification, user account classification, patient classification, etc.). In some embodiments, when developing a model, the model development module 132 may use the iterative process of evaluating, re-configuring, and re-training to enhance the performance of the model.

Specifically, the model development manager 202 may use the model configuration module 206 to determine an initial (e.g., a first) configuration for the model. The model development manager 202 may generate a computer-based model according to the first configuration. The first configuration may specify different characteristics of the model. For example, the first configuration may specify a number of input parameters for the computer-based model. In some embodiments, the first configuration may also specify which input parameters are used by the computer-based model for the data classification.

In some embodiments, the model development manager 202 may obtain a list of possible input parameters for the model. The list of possible input parameters may be related to attributes associated with the data to be classified by the computer-based model. For example, when the computer-based model is being developed to classify transactions (e.g., electronic payment transactions), the list of possible input parameters may include a payment amount associated with a transaction, a time of day or day of month when the transaction was initiated, historic transaction frequency associated with an account involved in the transaction, historic transaction amounts associated with the account, an identity of a payee, a network address (e.g., an Internet Protocol (IP) address) of a device that initiated the transaction, and other information associated with the electronic transaction, or other attributes related to a transaction. When the computer-based model is being developed to classify user accounts, the list of possible input parameters may include a transaction history of a user account, login frequency associated with the user account, a rate of failed logins associated with the user account, network addresses of devices used to access the user account, and other information associated with the user account. The model development management may obtain the list of possible input parameters based on input parameters used from other models configured to perform the same type of classifications.

In another example, when the computer-based model is being developed to classify a presence of a disease or condition in a patient (e.g., a cancer, a viral infection, etc.), the list of possible input parameters may include a blood pressure, an amount of certain enzyme in the body, an amount of certain anti-body in the body, etc.

Thus, the model configuration module 206 may select, from the list of possible input parameters, one or more input parameters that correspond to the determined number of input parameters to be used by the computer-based model.

When the computer-based model developed by the model development module 132 is a machine-learning model, the model training module 210 may be configured to train the computer-based model using training data sets obtained from a data storage 270. The first configuration may also include one or more hyper-parameters for configuring the model training module 210 in training the computer-based model. In some embodiments, the first configuration may also include weights assigned to different sets of training data stored in the data storage 270. The weights that are assigned to the different sets of training data affects how each set of training data influences the adjustments to the computer-based model during the training process. For example, the larger the weight, the more influence a set of training data is during the training process of the computer-based model.

Once the first configuration is determined, the model development manager 202 may generate a computer-based model (e.g., a model 252) according to the first configuration. For example, the model development manager 202 may generate the computer-based model 252 that is configured to receive the number of input parameters and the type of input parameters specified in the first configuration. The computer-based model 252 may be configured to provide an output value based on the set of input parameters. Based on the output value and a cutoff value (e.g., a threshold), the computer-based model 252 may classify a set of data (e.g., a transaction, a user account, a patient, etc.) into a classification (e.g., positive or negative, etc.). When the computer-based model 252 is a machine learning model, the model development manager 202 may also assign weights to the different sets of training data in the data storage 270 according to the first configuration and configure the model training module 210 to train the computer-based model 252 according to the hyper-parameters specified in the first configuration.

The model development manager 202 may then use the model training module 210 to train the computer-based model 252 using the weighted sets of training data in the data storage 270. The model training module 210 may use the hyper-parameters specified in the first configuration to train the computer-based model 252. Once the computer-based model 252 is trained, the model evaluation module 208 may evaluate the performance of the computer-based model 252 under the first configuration.

In some embodiments, the model evaluation module 208 may evaluate the performance of the computer-based model 252 using the partial area under the curve techniques as discussed herein. For example, the model evaluation module 208 may use the computer-based model 252 that is configured under the first configuration to iteratively classify a set of data (e.g., a set of transactions, etc.) using different cutoff values along a range of cutoff values. When the output values of the computer-based model 252 can be a value within a range of values, the model evaluation module 208 may select multiple cutoff values within that range of values. For example, when the output values of the computer-based model 252 can be a value between 0 and 100, the model evaluation module 208 may select cutoff values such as 5, 10, 17, 25, 50, 62, 74, 84, 97, and so forth. The sets of data that the model evaluation module 208 uses for evaluating the computer-based model 252 may be the same of different from the sets of training data. Based on the different cutoff values, the computer-based model 252 may classify the sets of data differently, and may have different classification characteristics, such as different true positives, different false positives, etc. After each pass of classifying the sets of data by the computer-based model 252 using a particular cutoff value, the model evaluation module 208 may determine the classifying characteristics of the computer-based model 252. For example, the model evaluation module 208 may determine a true positive rate (TPR) that can be defined as (number of true positive classifications)/(the sum of (number of true positive classifications) and (number of false negative classifications)). The model evaluation module 208 may also determine a false positive rate (FPR) that can be defined as (number of false positive classifications)/ (the sum of (number of false positive classifications) and (number of true negative classifications)). The model evaluation module 208 may then plot, on a performance graph, a point that denotes the performance of the computer-based model with respect to the particular cutoff value. After plotting different points on the performance graph that denote the performance of the computer-based model 252 with respect to the different corresponding cutoff values, the model evaluation module 208 may generate a performance curve on the performance graph that represent the performance of the computer-based model 252 across the range of cutoff values.

Figure 3:
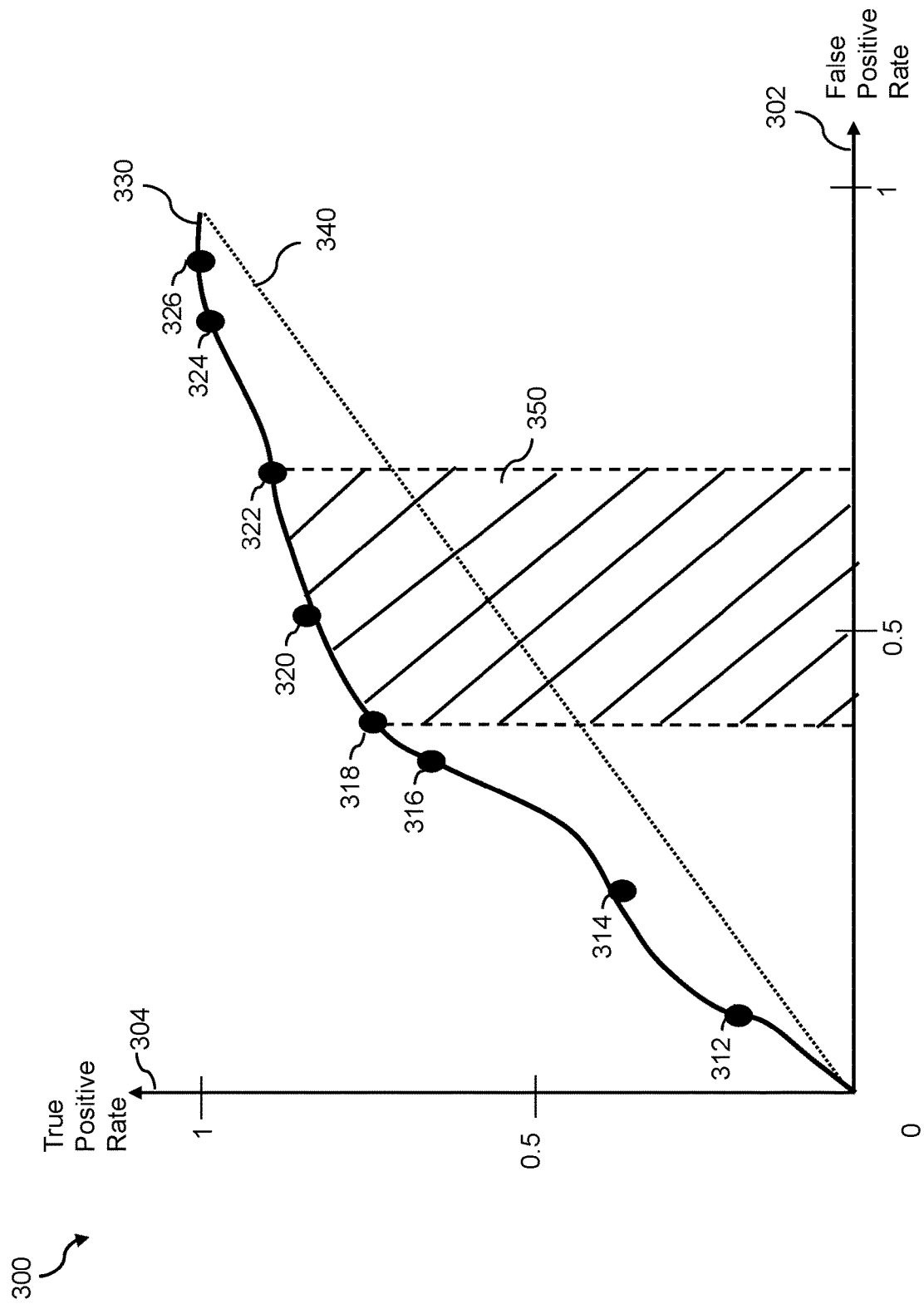
FIG. 3 illustrates an example performance curve representing a performance of a computer-based model across a spectrum of cutoff values according to an embodiment of the present disclosure.

FIG. 3 illustrates an example performance graph 300 for representing the performance of a computer-based model across a range of cutoff values. As shown, the performance graph 300 includes two axes, a horizontal axis 302 representing the FPR and a vertical axis 304 representing the TPR. As the model evaluation module 208 uses the computer-based model 252 under the first configuration to classify the sets of data using different cutoff points, the model evaluation module 208 may determine a TPR and an FPR for each of the different cutoff points. Based on the TPR and FPR, the model evaluation module 208 may determine a point on the performance graph (e.g., the point that intersects the TPR value and the FPR value). For example, the model evaluation module 208 may determine a point 312 for the first cutoff value (e.g., 5) based on the TPR and FPR corresponding to the first cutoff value. The model evaluation module 208 may continue to plot different points 314-326 on the performance graph 300 based on the TPRs and FPRs corresponding to the different cutoff values.

After determining the different points 312-326 on the performance graph 300 that correspond to the different cutoff values, the model evaluation module 208 may generate a performance curve 330 based on the points 312-326. In some embodiments, the model evaluation module 208 may determine the performance curve 330 using a regression technique. For example, the model evaluation module 208 may determine a function representing the curve based on the points 312-326. In this example, the performance curve 330 covers the entire range of cutoff values (even though the model evaluation module 208 may generate a performance curve that covers only a portion of the entire range of cutoff values in some embodiments). Thus, the performance curve 330 represents the performance of the computer-based model 252 under the first configuration across the entire range of cutoff values.

The line 340 represents values in the performance graph 300 where the TPR equals the FPR. In other words, the line 340 represents a median performance that can be achieved by a random classifier. Any value above (e.g., to the left) of the line 340 (where TPR is greater than FPR) represents an above-average performance and any value below (e.g., to the right) of the line 340 (where TPR is less than FPR) represents a below-average performance.

In some embodiments, the model evaluation module 208 may determine a performance value for the computer-based model 252 under the first configuration based on the performance curve 330. Specifically, the model valuation module 208 may determine the performance value based on an area under the performance curve 330. For example, the model valuation module 208 may determine the performance value by calculating the area under the performance curve 330. However, while the performance curve 330 represents the performance of the computer-based model 252 under the entire range of cutoff values (e.g., 0%-100%, etc.), in reality, only a sub-range of the cutoff values (e.g., 45%-65%) are (will be) used by the computer-based model 252 in performing data classification, since some cutoff values (e.g., those that are not within the sub-range) will never produce good enough classification result. As such, a performance value that is determined based on the entire area under the performance curve 330 may be misleading.

For example, the computer-based model under a first configuration may perform worse than the computer-based model under a second configuration within the sub-range of the cutoff values. However, the first configuration may have a larger overall area under the curve possibly because the performance of the computer-based model under the first configuration performs relatively better than the computer-based model under the second configuration using cutoff values outside of the sub-range of the cutoff values. Since the cutoff values outside of the sub-range will not be used to perform data classification, the performance of the computer-based model with respect to those cutoff values outside of the sub-range is irrelevant.

Thus, in some embodiments, the model evaluation module 208 may determine the performance value by calculating only a partial area under the curve. Specifically, the model evaluation module 208 may determine the sub-range of cutoff values that may be used by the computer-based model 252. The model evaluation module 208 may determine the sub-range of cutoff values for the computer-based model 252 based on different factors, such as a historic usage of the computer-based model 252 (or similar models in performing the same type of data classification such as classifying transactions, etc.), input received from a human administrator, and/or statistical analysis of the performance curve 330. For example, the model evaluation module 208 may determine a minimum value in the sub-range where the performance improvement from previous cutoff values has plateaued (e.g., the delta between the point on the performance curve 330 corresponding to the current cutoff value and the point on the performance curve 330 corresponding to a previous cutoff value is no longer more than a linear increase, etc.). The model evaluation module 208 may also determine a maximum value in the sub-range where there is a performance reduction from previous cutoff values (e.g., the delta between the point on the performance curve 330 corresponding to the current cutoff value and the point on the performance curve 330 corresponding to a previous cutoff value is less than a linear increase, etc.).

In some embodiments, the model evaluation module 208 may analyze cutoff values used by the computer-based model 252 in the past and/or other model(s) that perform similar data classification function. The model evaluation module 208 may perform one or more statistical analysis on the cutoff values used by the computer-based model 252 in the past and/or other similar models to determine a sub-range of cutoff values (e.g., 80% of what the models have been using in the past).

Once the sub-range of cutoff values (e.g., 45%-65%) is determined, the model evaluation module 208 may determine a performance value for the computer-based model 252 under the first configuration based on a partial area under the performance curve 330 corresponding to the sub-range of cutoff values. For example, the model evaluation module 208 may determine that the minimum cutoff value of the sub-range corresponds to the point 318 on the performance curve 330 and the maximum cutoff value of the sub-range corresponds to the point 322 on the performance curve 330. The model evaluation model 208 may then calculate the area 350 in the graph 300 under the portion of the performance curve 330 between the point 318 and 322. The model evaluation model 208 may determine the performance value for the computer-based model 252 under the first configuration based on the area 350. For example, the performance value may equal the size of the area 350 (or may be derived from the size of the area 350) in some embodiments.

After determining a performance value for the computer-based model 252 under the first configuration, the model development manager 202 may use the model configuration module 206 to generate a different configuration (e.g., a second configuration) for the computer-based model 252 by modifying the first configuration. The first configuration can be modified in different ways. For example, the model configuration model 206 may modify the first configuration by changing the number of input parameters for the computer-based model 252. In some embodiments, the model configuration module 206 may determine an initial number of input parameters (e.g., 1, 5, 50, etc.), and may progressively increase or decrease the number input parameters in each configuration. For example, the model configuration module 206 may determine the first configuration that specifies one input parameter for the computer-based model 252. The model configuration module 206 may then progressively increase the number of input parameters for the computer-based model 252 by a predetermined number (e.g., 1, 2, 5, etc.). Thus, the model configuration module 206 may determine the second configuration that specifies two input parameters.

Instead of, or in addition to, modifying the number of input parameters, the model configuration module 206 may modify other aspects of the first configuration. For example, the model development system may modify the input parameters (e.g., using one or more different input parameters) for the computer-based model 252. Thus, in some embodiments, the model configuration module 206 may replace one or more input parameters specified in the first configuration with one or more different input parameters. As discussed herein, for every type of data classification, a list of possible input parameters may be obtained. The list of possible input parameters may be associated with attributes of the underlying data to be classified. The model configuration module 206 may select one or more input parameters from the first configuration to be removed and select one or more input parameters from the list of possible input parameters to add to the configuration.

When the computer-based model 252 is a machine learning model, the model configuration module 206 may modify one or more hyper-parameters specified in the first configuration. A hyper-parameter is a parameter that controls the learning process of the machine learning model. The hyper-parameters do not change during the training process, while other parameters (e.g., node weights, etc.) can be adjusted during the training process. The hyper-parameters affect the speed and quality of the learning process.

In some embodiments, the model configuration module 206 may assign weights to different sets of training data. The weights to the different sets of training data may affect how the machine learning model is trained (the extent of adjustment from each set of training data). Thus, the model configuration module 206 may adjust the weights assigned to the different sets of training data stored in the data storage 270.

Once the model configuration module 206 determines the second configuration, the model development manager 202 may re-configure the computer-based model 252 under the second configuration. If the computer-based model 252 is a machine learning model, the model training module 210 may also train the computer-based model 252 using the set of training data stored in the data storage 270. The model evaluation module 208 may evaluate the performance of the computer-based model 252 under the second configuration using the partial area under the curve techniques as disclosed herein. For example, the model evaluation module 208 may use the computer-based model 252 under the second configuration to classify sets of data iteratively using different cutoff values. The model evaluation module 208 may calculate the TPR and FPR and use those values to plot the performance graph 300. A different performance curve (different from the performance curve 330) may be generated for the second configuration. The model evaluation module 208 may then determine a performance value for the computer-based model 252 under the second configuration.

The model development module 132 may continue to re-configure the computer-based model 252 (according to a third configuration, fourth configuration, fifth configuration, etc.), re-train the computer-based model 252, and evaluate the computer-based model 252 under different configurations. Based on the performance values determined for the computer-based model 252 under different configurations, the model development manager 202 may determine an optimal configuration for the computer-based model 252.

In some embodiments, instead of modifying multiple characteristics of the computer-based model during each configuration change, the model configuration module 206 may modify on characteristic at a time. For example, in the second configuration, the model configuration module 206 may adjust only the number of input parameters. The model configuration module 206 may continue to only adjust the number of input parameters and evaluate the performance of the computer-based model 252 under different configurations that specify different numbers of input parameters. Based on the performance values associated with the different configurations, the model configuration module 206 may determine the optimal number of input parameters. The model configuration module 206 may then move on to another characteristic (e.g., input parameters) and begin to adjust the type of input parameters in different configurations, to determine the optimal input parameters based on the performance values associated with the different configurations. The model configuration module 206 may continue to evaluate the performance of the computer-based model 252 by adjusting one characteristic at a time, until the model development manager 202 determines an optimal configuration for the computer-based model 252. In some embodiments, the optimal configuration has a highest performance value among all of the configurations that have been developed and evaluated by the model development module 132.

Once the model development manager 202 determines an optimal configuration for the computer-based model 252, the model development manager 202 may deploy the computer-based model 252 under the optimal configuration. For example, the classification module 204 may use the computer-based model 252 to begin classifying data (e.g., classifying transactions, classifying user accounts, etc.). If the computer-based model 252 is a machine-learning model, the model training module 210 may train the computer-based model 252 using the training data stored in the data storage 270 (or different sets of training data than the ones used for evaluating the computer-based model 252) before the computer-based model 252 is deployed. In some embodiments, the interface server 134 and/or the service application 138 may use the computer-based model 252 to classify data via the classification module 204.

In some embodiments, the model development module 132 may develop other computer-based models (e.g., the computer-based models 254, 256, etc.) using the same techniques. The computer-based models that are developed using the enhanced iterative feedback and adjustment have better performance than models developed in conventional manners.

Figure 4:
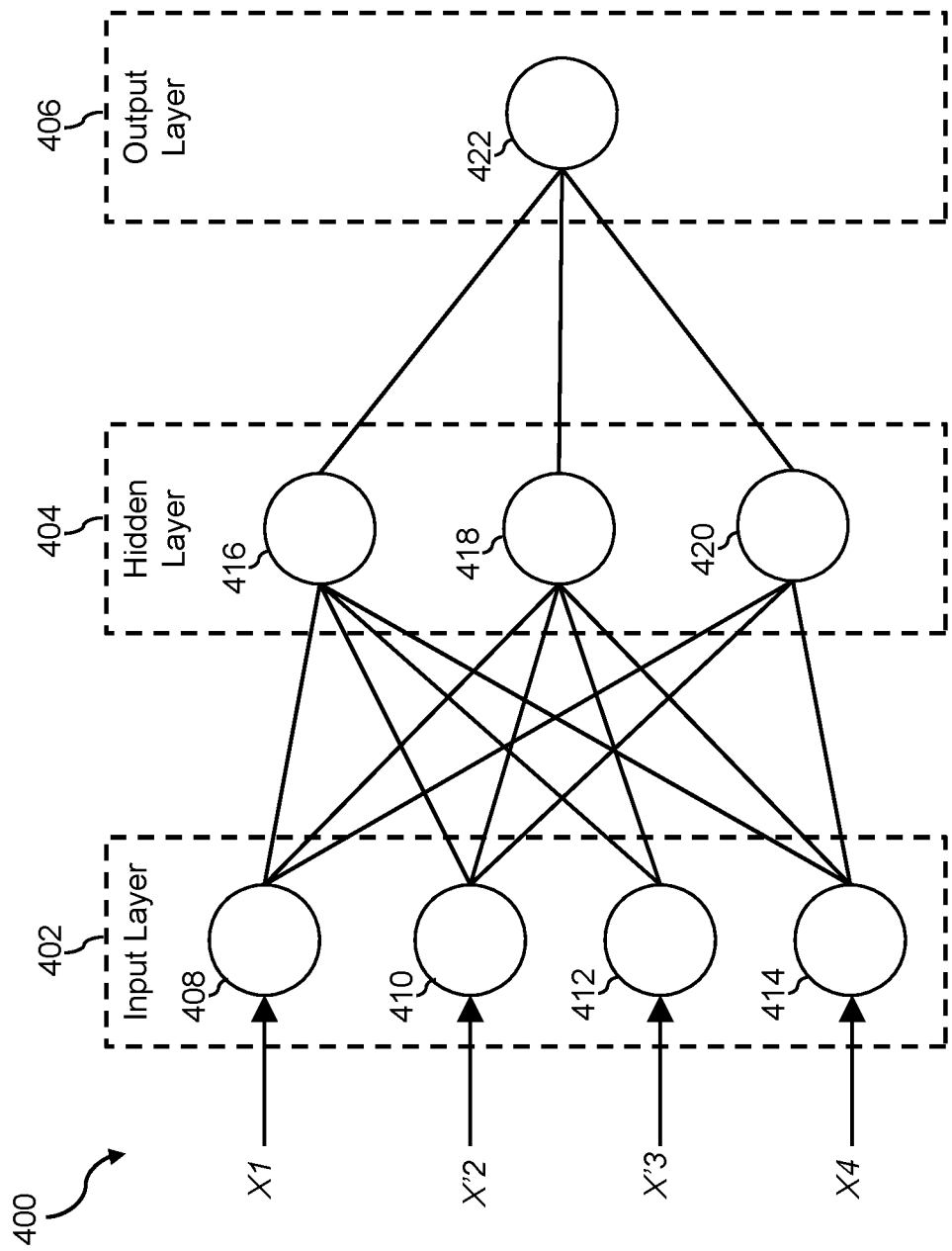
FIG. 4 illustrates an example neural network that can be used to implement a computer-based model according to an embodiment of the present disclosure.

FIG. 4 illustrates an example artificial neural network 400 that may be used to implement the any one of the computer-based models 252, 254, and/or 256. As shown, the artificial neural network 400 includes three layers—an input layer 402, a hidden layer 404, and an output layer 406. Each of the layers 402, 404, and 406 may include one or more nodes. For example, the input layer 402 includes nodes 408-414, the hidden layer 404 includes nodes 416-420, and the output layer 406 includes a node 422. In this example, each node in a layer is connected to every node in an adjacent layer. For example, the node 408 in the input layer 402 is connected to all of the nodes 416-420 in the hidden layer 404. Similarly, the node 416 in the hidden layer is connected to all of the nodes 408-414 in the input layer 402 and the node 422 in the output layer 406. Although only one hidden layer is shown for the artificial neural network 400, it has been contemplated that the artificial neural network 400 used to implement any one of the computer-based models 252, 254, and 256 may include as many hidden layers as necessary.

In this example, the artificial neural network 400 receives a set of input values and produces an output value. Each node in the input layer 402 may correspond to a distinct input value. For example, when the artificial neural network 400 is used to implement the computer-based model 252, each node in the input layer 402 may correspond to a distinct input parameter specified in the configuration (e.g., an attribute of an electronic payment transaction, etc.). As such, under different configurations, the number of nodes in the input layer 402 for the computer-based model 252 may change and the input parameter that each node in the input layer 402 corresponds to may be different as well.

In some embodiments, each of the nodes 416-420 in the hidden layer 404 generates a representation, which may include a mathematical computation (or algorithm) that produces a value based on the input values received from the nodes 408-414. The mathematical computation may include assigning different weights (e.g., node weights, etc.) to each of the data values received from the nodes 408-414. The nodes 416-420 may include different algorithms and/or different weights assigned to the data variables from the nodes 408-414 such that each of the nodes 416-420 may produce a different value based on the same input values received from the nodes 408-414. In some embodiments, the weights that are initially assigned to the features (or input values) for each of the nodes 416-420 may be randomly generated (e.g., using a computer randomizer). The values generated by the nodes 416-420 may be used by the node 422 in the output layer 406 to produce an output value for the artificial neural network 400. When the artificial neural network 400 is used to implement the computer-based model 252, the output value produced by the artificial neural network 400 may indicate a classification of data (e.g., a classification of a transaction) dependent on a cutoff value.

The artificial neural network 400 may be trained by using training data. By providing training data to the artificial neural network 400, the nodes 416-420 in the hidden layer 404 may be trained (adjusted) such that an optimal output (e.g., a classification) is produced in the output layer 406 based on the training data. By continuously providing different sets of training data, and penalizing the artificial neural network 400 when the output of the artificial neural network 400 is incorrect (e.g., when the determined (predicted) likelihood is inconsistent with whether the profile is connected with the entity, etc.), the artificial neural network 400 (and specifically, the representations of the nodes in the hidden layer 404) may be trained (adjusted) to improve its performance in data classification. Adjusting the artificial neural network 400 may include adjusting the weights associated with each node in the hidden layer 404.

Figure 5:
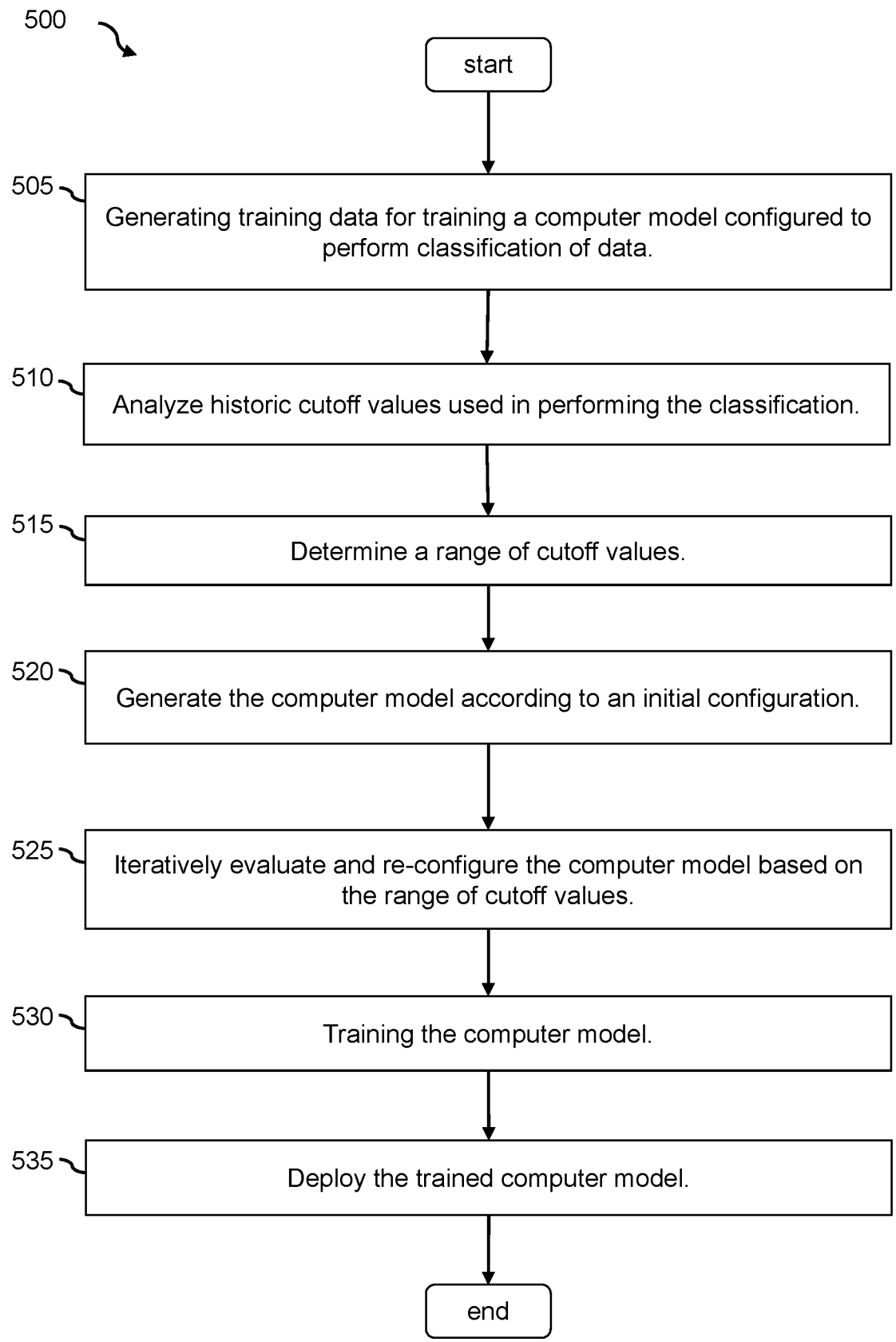
FIG. 5 is a flowchart showing a process of developing a computer-based model according to an embodiment of the present disclosure.

FIG. 5 illustrates a process 500 for developing computer-based models according to various embodiments of the disclosure. In some embodiments, at least a portion of the process 500 may be performed by the model development module 132. The process 500 begins by generating (at step) 505 training data for training a computer model configured to perform classification of data. For example, the model development manager 202 may obtain historical data that has been labeled and store the historical data in the data storage 270 for training the computer-based model 252. When the computer-based model 252 is configured to classify transactions, the training data may include transaction data associated with past transactions that have been conducted through the service provider server 130 and labeled.

The process 500 then analyzes (at step 510) historic cutoff values used in performing the classification and determines (at step 515) a range of cutoff values. For example, the model development manager 202 may analyze cutoff values used by the computer-based model 252 in the past (and/or other similar models for performing the same type of data classification). The model development manager may determine the range of cutoff values based on statistical analysis on the cutoff values used in the past (e.g., the range of cutoff values that was used for over 80% in the past, etc.).

The process 500 generates (at step 520) the computer model according to an initial configuration. For example, the model configuration module 206 may determine an initial (e.g., a first) configuration for the computer-based model 252. The initial configuration may specify different characteristics of the computer-based model 252 and/or different attributes in training the computer-based model 252. In particular, the initial configuration may specify a number of input parameters, the types of one or more input parameters, one or more hyper-parameters, and/or weights assigned to different sets of training data.

Figure 6:
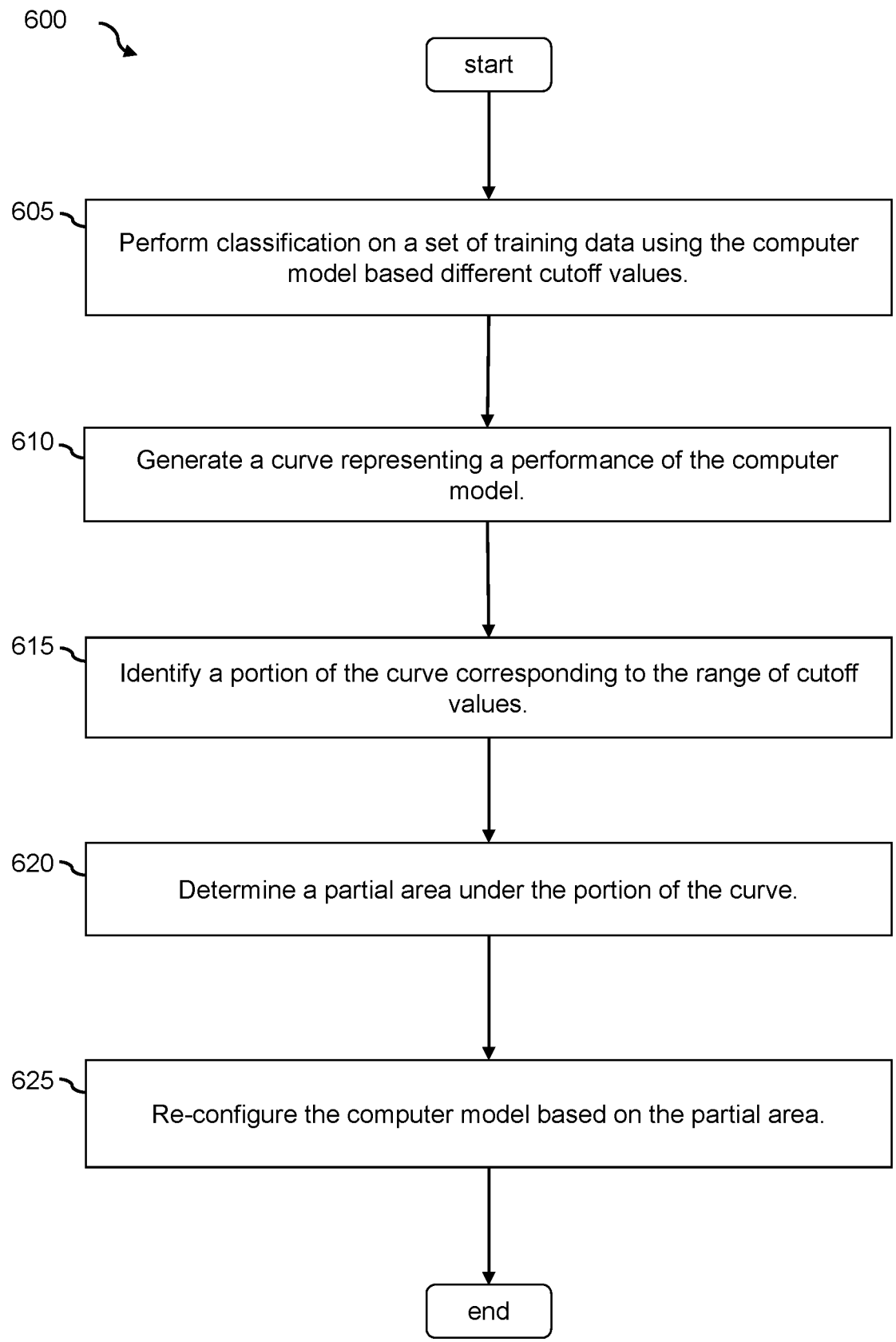
FIG. 6 is a flowchart showing a process of iteratively evaluating and re-configuring a computer-based model according to an embodiment of the present disclosure.

The process 500 then iteratively evaluates and re-configures (at step 525) the computer model based on the range of cutoff values. For example, the model development module 132 may iteratively evaluate, re-configure, and re-train the computer-based model 252 using the partial area under the curve techniques as disclosed herein. FIG. 6 illustrates a process 600 for evaluating and re-configuring a computer-based model according to various embodiments of the disclosure. In some embodiments, at least a portion of the process 600 may be performed by the model development module 132. The process 600 begins by performing (at step 605) classification on a set of training data using the computer model based on different cutoff values. For example, the classification module 204 may use the computer-based model 252 to classify sets of training data stored in the data storage 270 multiple times. Each time the classification module 204 classifies the sets of training data, the classification module 204 may use a different cutoff value. Based on the classifying of the sets of training data, the model evaluation module 208 may determine performance data (e.g., TPR, FPR, etc.) associated with the computer-based model 252 under the current configuration with respect to a particular cutoff value. The model evaluation module 208 may use the performance data to plot a point on a performance graph (e.g., the performance graph 300). Thus, each pass of classifying the sets of training data using a different cutoff value, a different point on the graph 300 is plotted.

The process 600 then generates (at step 610) a curve representing a performance of the computer model. For example, the model evaluation module 208 may generate a performance curve (e.g., the performance curve 330) based on the points plotted on the graph 300 (e.g., using a regression model). The performance curve 330 represents the performance of the computer-based model 252 under the current configuration across a spectrum of cutoff values (which may be larger than the range of cutoff values used by the computer-based model 252).

The process 600 identifies (at step 615) a portion of the curve corresponding to the range of cutoff values and determines (at step 620) a partial area under the portion of the curve. For example, the model evaluation module 208 may identify the portion of the performance curve 330 from the point 318 to the point 322 that corresponds to the range of cutoff values. The model evaluation module 208 may then calculate the area in the graph 300 under the portion of the performance curve 330. In some embodiments, the model evaluation module 208 may determine a performance value for the computer-based model 252 under the current configuration based on the area under the portion of the performance curve 330. The larger the area under the portion of the performance curve 330 indicates a better performance where a smaller area under the portion of the performance curve 330 indicates a worse performance.

The process 600 then re-configures (at step 625) the computer model based on the partial area. For example, the model development module 132 may use the model configuration module 206 to determine another configuration for the computer-based model 252. In some embodiments, the new configuration may be dependent on the changes of the areas under the performance curves (e.g., the changes in performance values). For example, when the current configuration specifies an increase of input parameters from the previous configuration, and the performance value associated with the current configuration is larger than the performance value associated with the previous configuration, the model configuration module 206 may continue to increase the number of input parameters. The amount of increase may also be proportional to the amount of increase in performance values in some embodiments. On the other hand, when the performance value associated with the current configuration is smaller than the performance value associated with the previous configuration, the model configuration module 206 may stop adjusting the number of input parameters in the next configuration or reduce the number of input parameters in the next configuration.

The model development module 132 may continue to develop different versions of the computer-based model 252 under different configurations and evaluate the computer-based model 252 under the different configurations. The model development module 132 may stop developing and evaluating the computer-based model 252 under a new configuration when the performance value stops increasing. The model development module 132 may determine an optimal configuration (e.g., the one with the highest performance value).

Referring back to FIG. 5, once the optimal configuration is determined, the process 500 trains (at step 530) the computer model and deploys (at step 535) the trained computer model. For example, the model training module 210 may train the computer-based model 252 under the optimal configuration and may deploy the computer-based model 252.

Figure 7:
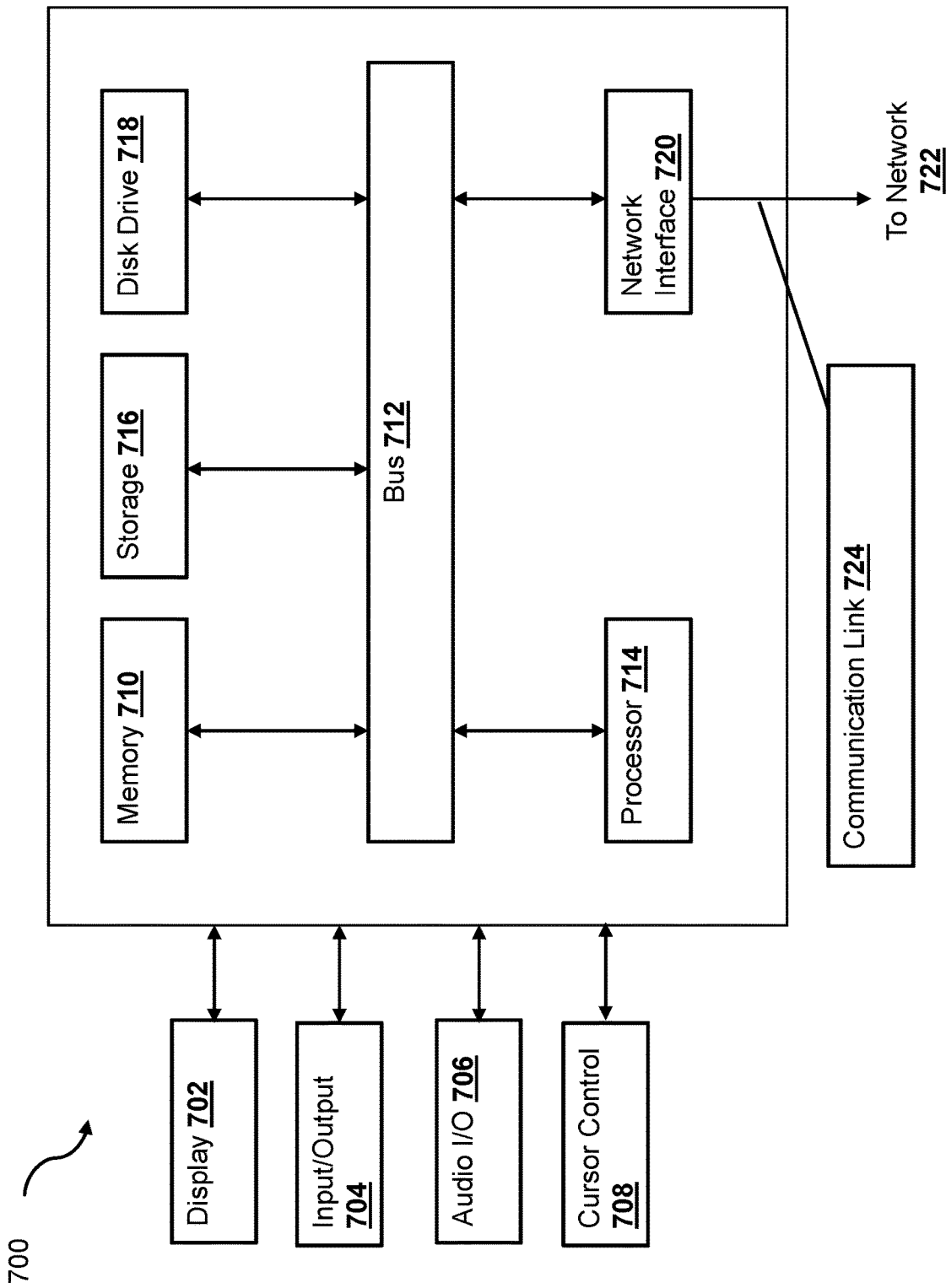
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform the model development functionalities described herein according to the processes 500 and 600.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
configuring a machine learning model to perform data classifications using a first model configuration, wherein the first model configuration specifies a first number of input features;
processing a set of data records using the machine learning model based on a plurality of cutoff values;
generating a first graph comprising a first curve that represents a performance of the machine learning model with respect to the plurality of cutoff values based on the processing the set of data records;
determining a first area in the first graph under a portion of the first curve;
iteratively (i) modifying the machine learning model to include an increased number of input features, (ii) determining a performance of the modified machine learning model based on an area under a corresponding curve, and (iii) determining a performance comparison between the modified machine learning model and a previous iteration of the machine learning model, wherein the iteratively modifying is performed in a subsequent iteration when the performance comparison shows a first pattern and is aborted when the performance comparison shows a second pattern different from the first pattern;
determining, for the machine learning model, a second model configuration based on the iteratively modifying the machine learning model, wherein the second model configuration specifies a second number of input features;
re-configuring the modified machine learning model using the second model configuration;
classifying, using the re-configured machine learning model, a transaction request as a legitimate transaction, a possible fraudulent transaction, or a fraudulent transaction; and
processing the transaction request based on the classifying, wherein the processing the transaction comprises authorizing the transaction, denying the transaction, or requesting additional information from a device.

2. The system of claim 1, wherein the machine learning model is configured to perform binary classifications.

3. The system of claim 1, wherein the operations further comprise:
analyzing cutoff values from the plurality of cutoff values used by one or more machine learning models for performing the data classifications, wherein the plurality of cutoff values is determined based on the analyzing.

4. The system of claim 1, wherein the re-configuring the modified machine learning model comprises adjusting at least one hyper-parameter of the modified machine learning model.

5. The system of claim 4, wherein the operations further comprise training the re-configured machine learning model based on the adjusted at least one hyper-parameter.

6. The system of claim 1, wherein the first pattern indicates an increase of performance by a threshold.

7. The system of claim 1, wherein the area under the corresponding curve is generated based on processing the set of data records using the modified machine learning model.

8. A method comprising:
accessing, by a computer system, a computer-based model configured to perform data classifications using a first configuration, wherein the first configuration specifies a first number of input features;
processing a set of data records using the computer-based model based on a plurality of cutoff values;
generating, by the computer system, a first performance curve that represents a performance of the computer-based model with respect to the plurality of cutoff values based on the processing the set of data records;
determining, by the computer system, a first partial area under the first performance curve;
iteratively, by the computer system, (i) modifying the computer-based model to include an increased number of input features, (ii) determining a performance of the modified computer-based learning model based on a partial area under a corresponding performance curve, and (iii) determining a performance comparison between the modified computer-based model and a previous iteration of the computer-based model, wherein the computer-based model is continued to be modified in a subsequent iteration when the performance comparison shows a first pattern, wherein the iteratively modifying the computer-based model is aborted when the performance comparison shows a second pattern different from the first pattern, wherein the second model configuration specifies a second number of input features;
determining, by the computer system and for the computer-based model, a second model configuration based on the iteratively modifying the computer-based model;
re-configuring the modified computer-based model according to the second model configuration;
classifying, using the re-configured computer-based model, a transaction request as a legitimate transaction, a possible fraudulent transaction, or a fraudulent transaction; and
processing the transaction request based on the classifying, wherein the processing the transaction comprises authorizing the transaction, denying the transaction, or requesting additional information from a device.

9. The method of claim 8, wherein the computer-based model is a machine learning model, wherein the second configuration further specifies one or more hyper-parameters for the machine learning model, and wherein the method further comprises training the re-configured computer-based model using the one or more hyper-parameters specified in the second configuration.

10. The method of claim 8, further comprising deploying the re-configured computer-based model for performing the data classification.

11. The method of claim 8, wherein the first configuration specifies a first set of hyper-parameters, and wherein the second configuration specifies a second set of hyper-parameters different from the first set of hyper-parameters.

12. The method of claim 8, wherein the second configuration specifies one or more input features that are not included in the first configuration.

13. The method of claim 8, wherein the transaction request is received from the device.

14. The method of claim 8, wherein the corresponding performance curve tracks a ratio between a true positive rate and a false positive rate associated with the modified computer-based model across the plurality of cutoff values.

15. A non-transitory machine-readable medium having stored thereon machine-readable instructions executable to cause a machine to perform operations comprising:
accessing a computer-based model configured to perform data classifications using a first model configuration, wherein the first model configuration specifies a first number of input features;
processing a set of data records using the computer-based model based on a plurality of cutoff values;
generating a first graph comprising a first curve that represents a performance of the computer-based model with respect to the plurality of cutoff values based on the processing the set of data records;
determining a first area in the first graph under a portion of the first curve;
determining, for the computer-based model, a second model configuration, wherein the determining the second model configuration comprise iteratively (i) modifying the computer-based model to include an increased number of input features, (ii) determining a performance of the modified computer-based model based on an area under a portion of a corresponding curve, and (iii) determining a performance comparison between the modified computer-based model and a previous iteration of the computer-based model, wherein the computer-based model is continued to be modified in a subsequent iteration when the performance comparison shows a first pattern, wherein the iteratively modifying the computer-based model is aborted when the performance comparison shows a second pattern different from the first pattern, wherein the second model configuration specifies a second number of input features used in a last iteration of the modifying the computer-based model;
re-configuring the modified computer-based model using the second model configuration;
classifying, using the re-configured computer-based model, a transaction request as a legitimate transaction, a possible fraudulent transaction, or a fraudulent transaction; and
processing the transaction request based on the classifying, wherein the processing the transaction comprises authorizing the transaction, denying the transaction, or requesting additional information from a user device.

16. The non-transitory machine-readable medium of claim 15, wherein the operations further comprise:
deploying the re-configured computer-based model.

17. The non-transitory machine-readable medium of claim 15, wherein the transaction request is received from the user device.

18. The non-transitory machine-readable medium of claim 15, wherein the computer-based model is a machine learning model, wherein the set of records is a set of training records used to train the machine learning model, and wherein the operations further comprise:
adjusting weights assigned to the set of training records; and
re-training the reconfigured computer-based model using the set of training records assigned with the adjusted weights.

19. The non-transitory machine-readable medium of claim 15, wherein the second model configuration specifies one or more input features excluded from the first model configuration.

20. The non-transitory machine-readable medium of claim 19, wherein the transaction request is received from the user device.

\* \* \* \* \*